United States Patent

[11] 3,627,867

[72] Inventor Eckhard Christian August Schwarz
 Grifton, N.C.
[21] Appl. No. 757,680
[22] Filed Sept. 5, 1968
[45] Patented Dec. 14, 1971
[73] Assignee E. I. du Pont de Nemours and Company
 Wilmington, Del.

[54] PROCESS OF MELT-SPINNING HIGH-MOLECULAR-WEIGHT ETHYLENE TEREPHTHALATE POLYMER
 5 Claims, 2 Drawing Figs.

[52] U.S. Cl. ............................................. 264/211,
 260/75 EP, 264/176 F
[51] Int. Cl. ......................................................... D01f 1/00,
 C08g 17/00
[50] Field of Search ............................................. 260/75, 47
 EP, 75 EP, 2.5 E, 28, 29.1, 33.8, 823; 264/211,
 176, 41, 51, 53, 170

[56] References Cited
 UNITED STATES PATENTS

| | | | |
|---|---|---|---|
| 2,720,500 | 10/1955 | Cody | 260/47 |
| 2,863,855 | 12/1958 | Wilson | 260/75 |
| 2,998,408 | 8/1961 | Zoetbrood | 260/47 |
| 3,050,783 | 8/1962 | Pirot | 264/170 |
| 3,089,863 | 5/1963 | Hicks | 260/75 |
| 3,275,606 | 9/1966 | Kujawa | 260/75 |
| 3,372,143 | 3/1968 | Terada | 260/47 |
| 3,455,863 | 7/1969 | Williams | 264/211 |
| 3,491,066 | 1/1970 | Petropoulos | 260/75 EP |
| 3,547,872 | 12/1970 | Weissermel et al. | 260/40 |

FOREIGN PATENTS

| | | | |
|---|---|---|---|
| 831,987 | 4/1960 | Great Britain | 260/75 |
| 1,139,379 | 1/1969 | Great Britain | |
| 1,034,854 | 7/1958 | Germany | 260/75 EP |
| 1,091,747 | 10/1960 | Germany | 260/75 EP |
| 1,247,018 | 8/1967 | Germany | 264/211 |
| 1,093,840 | 12/1967 | Great Britain | |
| 1,126,915 | 9/1968 | Great Britain | |

Primary Examiner—Jay H. Woo
Attorney—Norris E. Ruckman

ABSTRACT: A process and apparatus are disclosed for melt-spinning high-molecular-weight polyethylene terephthalate into high-performance fibers under conditions which reduce the normally high viscosity of such polyester. Ethylene oxide or other low-boiling oxirane compound is injected under pressure into molten polyester before it is fed to the metering pump of the melt-spinning machine. Illustrations show that injection of amounts as small as 0.3 percent provide a substantial reduction in filter pack pressure. The fibers are characterized by low free-carboxyl content and freedom from voids which might be expected from injection of the volatile material.

PATENTED DEC 14 1971     3,627,867

INVENTOR
ECKHARD CHRISTIAN AUGUST SCHWARZ

ATTORNEY

PROCESS OF MELT-SPINNING HIGH-MOLECULAR-WEIGHT ETHYLENE TEREPHTHALATE POLYMER

BACKGROUND OF THE INVENTION

1. Field of the Invention

This invention is concerned with the preparation of filamentary materials from high-molecular-weight linear condensation polyesters. More particularly, the invention is concerned with a novel method of reducing the melt viscosity of high-molecular-weight terephthalate polyesters to facilitate melt-spinning processes.

2. Description of the Prior Art

Terephthalate polyesters such as those disclosed by Whinfield and Dickson in U.S. Pat. No. 2,465,319 have become valuable articles of commerce and are produced in large quantities. The best known example is polyethylene terephthalate, which is widely available in the form of textile and industrial fibers. Recently, Chantry and Molini in U.S. Pat. No. 3,216,187 disclosed a particular form of polyethylene terephthalate fiber possessing outstanding properties suitable for use in reinforcing rubber articles such as pneumatic tires. In the manufacture of these high-performance fibers, it is necessary to melt-spin polyethylene terephthalate of unusually high molecular weight which is much more viscous than that used in making ordinary textile fibers. One of the problems accompanying the production of such high-molecular-weight fibers is the difficulty of handling the highly viscous polymer in pipelines, spinning pumps, filters, spinnerets and the like. It was pointed out by Chantry and Molini that the melt viscosity at 304° C. of polyethylene terephthalate is more than 10 times that of 6—6 nylon when the two polymers have the same relative viscosity (an indication of molecular weight).

It is known that the melt viscosity of high-molecular-weight polymers may be reduced by raising the temperature of the polymer or by adding a plasticizing agent (e.g., British Pat. Nos. 739,285, 805,586 and 805,587), but higher temperatures are known to cause polymer degradation, and plasticizers which remain in the fiber are found to cause changes in fiber properties and performance which are considered undesirable. The use of highly volatile plasticizing agents would evaporate from the polymer after spinning would appear to resolve the problem, but attempts to use many highly volatile agents have resulted in fibers filled with bubbles, as described by Miles in U.S. Pat. No. 2,268,160 and in British specification No. 891,143. The present invention is concerned with the discovery of a highly volatile material which acts as a plasticizing agent during spinning but which does not produce a bubble-filled fiber.

SUMMARY OF THE INVENTION

The present invention provides a novel method for reducing the melt viscosity of highly viscous, highly polymeric polyethylene terephthalate without giving rise to undesirable changes in properties and performance in fibers spun from the polymer. The invention further provides an easier and more convenient method of melt-spinning higher molecular weight polyethylene terephthalate through conventional spinning equipment at reduced pressures.

It has now been discovered that, by dispersing a highly volatile oxirane compound into a molten polyester under pressure and maintaining the molten polyester under pressure, the melt viscosity of the polyester can be drastically reduced and high-molecular-weight polymer may be handled in conventional equipment without the development of excessive pressures. Furthermore, when the polymer so treated is extruded into filaments, no evidence of bubble formation is found in the filaments.

Preferably, in the process for melt-spinning high-molecular-weight ethylene terephthalate polymer, the improvement of the present invention comprises raising the pressure of molten polymer above atmospheric, dispersing in the pressurized molten polymer a low-boiling oxirane compound to reduce the melt viscosity of the polymer, maintaining the molten polymer under pressure as it is transferred to a spinning machine, and melt-spinning the polymer through a filter and spinneret into a lower pressure zone. The extruded filaments are quenched and subsequently drawn to give tenacious fibers.

For best results, the oxirane compound should be mixed with the molten polyester (under pressure) for a period of at least 1 minute, and preferably 5–20 minutes, immediately before the polymer reaches the critical spinning machine elements of the extrusion operation, i.e., the metering gear-pump and filter. The mixing time may be longer than 20 minutes if desired, but usually times greater than about 45 minutes will be avoided to prevent unnecessary heat degradation of the polymer.

For best results, the molten polymer should be pressurized to a pressure of at least 25 p.s.i.g. before the oxirane compound is injected. The amount of oxirane compound added may vary over a wide range, depending upon the degree of reduction in melt viscosity desired. Preferably, the amount added will range from about 0.3 percent to about 10 percent by weight based on weight of polymer.

The "low-boiling oxirane compound" is preferably a compound represented by the structural formula

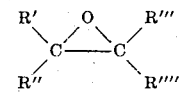

where each of $R'$, $R''$, $R'''$ and $R''''$ is a hydrogen or alkyl substituent.

Oxirane compounds suitable for use in the process of this invention include those having a boiling point at atmospheric pressure less than about 75° C., e.g., ethylene oxide, 1,2-epoxypropane, 1,2-epoxybutane and 1,2-epoxy-2-methylpropane.

Particularly advantageous results are obtained when the instant invention is used in the processing of polyethylene terephthalate having a molecular weight high enough to give a relative viscosity of 50 or higher.

DESCRIPTION OF THE DRAWINGS

The invention will be more fully understood by reference to the accompanying drawings in which:

Referring to FIG. 1, molten polyester at the exit end of polymer finisher vessel 1, normally under an absolute pressure of 0.5 to 5 mm. of mercury, passes into screw pump 2 under the urging of rotating screw 3. As the polymer traverses the screw-pump, its pressure is increased until at the exit end 4 of the pump the pressure has reached 500 p.s.i.g. (34 atmos.) or more. The pressurized polymer passes through heated conduit 5 to a conventional spinning machine 6 where a gear-pump 7 urges the molten polymer at a constant rate through a filter 8 and then through spinneret 9 into a quenching chamber, not shown. In accordance with the invention, a liquified low-boiling oxirane compound in pressurized feed tank 10 passes through supply line 11, then through metering pump 12 to pressure-release injection valve 13. From the injection valve, the oxirane passes to injection point 14 where it diffuses into the molten polymer. The injection valve preferably maintains a pressure differential of several hundred pounds per square inch, with the higher pressure being on the oxirane supply side. To provide adequate mixing and uniform plasticization, the polymer flow rate and apparatus dimensions are such that the exposure time between injection point 14 and spinning machine 6 is at least 1 minute and preferably falls in the range 5-20 minutes.

Figure 2:
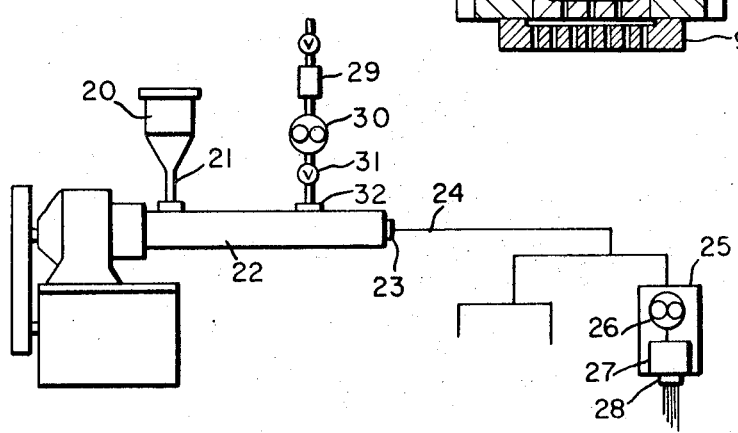
FIG. 2 is a schematic representation of another specific embodiment of process and apparatus suitable for carrying out the invention, utilizing injection of oxirane into a screw melter.

Now referring to FIG. 2, polyester flake maintained under a dry inert atmosphere in hopper 20 is fed through connecting tube 21 to the bore of screw melter 22. The heater inner screw of the screw melter melts the flake and urges it toward the exit end 23 under conditions of constantly increasing pressure. The pressure at exit 23 may be 500 p.s.i.g. (34 atmos.) or higher. The pressurized molten polymer has traverses heated conduit 24 which is branched to supply several spinning positions. The molten polymer reaching spinning machine 25 is forced at a constant rate by gear-pump 26 through filter 27 and spinneret 28 into a quenching zone. The extruded filaments are subsequently drawn and wound into a package by apparatus not shown in the drawing. In accordance with the invention, a pressurized highly volatile oxirane compound in supply tank 29 is passed through metering pump 30 to pressure release injection valve 31 which maintains a higher pressure on the oxirane supply side. From the injection valve the oxirane compound proceeds to injection point 32 where it becomes mixed with the molten pressurized polymer. To provide proper mixing and uniform plasticization, it is preferred that the polymer flow rate and apparatus dimensions are such that the exposure time between injection point 32 and spinning machine 25 is at least 1 minute and preferably ranges from 5-20 minutes.

Polymer pressure above the filter is measured by a pressure bulb in the filter assembly cavity to transfer the pressure hydraulically to a pressure sensor. A suitable device for this purpose is a volumetric pressure element having a button diaphragm and a 5-foot (1.5 meters) capillary extension between diaphragm and sensor (sold by the Taylor Company of Rochester, New York catalog termination No. 90).

To prepare the high-performance polyester fibers described by Chantry and Molini, U.S. Pat. No. 3,216,187, delayed quenching is necessary. That is, the polymer must be extruded into an atmosphere having a temperature at least as high as the melting point of the polymer, and the temperature of the gas adjacent to the filaments must be maintained at a high level for a distance of several inches. After most of the denier reduction has occurred, the filaments are quenched by contacting a flow of cooler air. Following quenching, the filaments are drawn at least 5.7X at a temperature above 80° C.

Although the process of the present invention is particularly valuable in the melt-spinning of very high-molecular-weight polyester, it may be used in any polyester melt-spinning process where a reduction in melt viscosity during spinning is desired.

DESCRIPTION OF SPECIFIC EMBODIMENTS

In the examples, the term "relative viscosity" refers to the ratio of the viscosity of a 10 percent solution (2.15 g. polymer in 20 ml. solvent) of polyethylene terephthalate in a mixture of 10 parts of phenol and 7 parts of 2,4,6-trichloro-phenol (by weight) to the viscosity of the phenoltrichlorophenol mixture, per se, measured in the same units at 25° C.

Yarn tenacity and break elongation are determined by means of an Instron tensile tester which extends a 10-inch (25.4 cm.) length yarn sample to its breaking point at an extension rate of 6 in./min. at about 25° C. Extension and breaking load are automatically recorded for each sample.

The free carboxyl content of polyesters is determined by dissolving the polymer in benzyl alcohol and titrating the solution with standard sodium hydroxide solution using phenol red as an indicator. Values reported in the examples were determined by weight a 0.10 to 0.12 g. sample to the nearest 0.0001 g., placing the sample in a test tube and adding 15 ml. benzyl alcohol. A stirrer is inserted and the test tube placed in a 217° C. sand bath for exactly 163 seconds while stirring. The tube is then immediately immersed in a 20° C. cooling bath for 20 seconds (with stirring) and then titrated to a pink color which persists for at least 10 seconds. A "blank" is determined by repeating the above steps without a polymer sample. Free carboxyl end groups in eq./$10^6$ g. are calculated from the formula $$\frac{(A-B) \times N_{NaOH}}{C} - D.C.F.$$

where: $A$ equals volume, in microliters, of NaOH solution used for sample. $B$ equals volume, in microliters, of NaOH solution used for blank. $N$ is the normality of the NaOH solution and $C$ equals sample weight in grams. $D.C.F.$ is the degradation correction factor.

The degradation correction factor is determined by carrying a titrated sample through the heating, quenching, and titration procedure a second time to give a measure of the number of carboxyl end groups generated by the procedure. For each new polyester, 10 determinations (with accompanying blanks) are made and the average value used as the degradation correction factor for that polymer.

The extent of bubble formation in extruded filaments is determined by inspection under a light microscope using bright field illumination and a magnification of about 200X.

The content of aliphatic ether linkages in terephthalate polyesters may be determined spectrophotometrically using an infrared spectrophotometer (Perlcin-Elmer Model 21 or equivalent with NaCl prism). The polymer sample is melt-pressed at 285° C. for 20 seconds into a film having a thickness of 3 or 7 mils. (0.076 or 0.178 mm.). The infrared absorbence is then scanned from 3.25 to 3.45 microns and adjusted for background scattering by subtracting the lowest absorbence at approximately 3.28-3.29 microns. Ether content is indicated by the ratio of the absorbence due to ethers at 3.25 microns to the absorbence due to film thickness at 3.45 microns. This ratio is compared with the corresponding ratio for films of known ether content to give an absolute value of ethers in mole percent.

EXAMPLE I

Polyester flake is melted and spun into filaments using apparatus similar to that shown in FIG. 2. The melter 22 is a "Point Eight" twin-screw extruder-extractor (Model No. F-DV 1-V2-S manufactured by Welding Engineers, Inc.) modified by sealing off the extractor section (at point 32) with a "high hat" having a ⅛-inch (3.2 mm.) hole drilled through to provide a connection with the oxirane injection system. The extruder urges the molten polymer through a heated conduit to a gear metering pump which supplies polymer to a heated metal block holding a filter of metal screens and a spinneret. Between the extruder and the metering pump, a side stream of polymer is taken off to waste through a pressure relief valve in order to maintain constant pressure to the gear pump.

The dried polyethylene terephthalate flake supplied to hopper 20 has a relative viscosity of 65, a $TiO_2$ content of 0.1 percent, a free carboxyl content of 19.1 eq./$10^6$ g., and an ether linkage content of 1.6 mol percent. The screw melter is operated at a temperature of 295° C. and the polymer throughput rate is such that the available mixing time between the oxirane injection point 32 and spinneret 28 is approximately 14 minutes. The filter 27 consists of five layers of 200 mesh stainless steel screening. The spinneret has 34 holes, with the hole diameter being 0.009 inch (0.23 mm.). The filter temperature is maintained at 305° C. and a pressure gauge is used to measure the pressure of the molten polymer between gear pump 26 and filter 27. Filaments extruded from the spinneret are quenched and subsequently drawn 4.6X at a temperature of 125° C.

a. The apparatus is first operated with valve 31 closed so that no oxirane compound is injected into the polymer. The measured filter pressure is 2,000 p.s.i.g. (136 atmos.). The yarn produced has a relative viscosity of 38, a carboxyl content of 33.3 eq./$10^6$ g., an ether content of 2.0 mol percent, and exhibits a tenacity of 5.7 g.g.d. with a break elongation of 18.7 percent.

b. With the general conditions maintained as above, ethylene oxide is charged to supply vessel 29 and metering pump 30 operated in inject ethylene oxide into the polymer at a rate sufficient to provide a concentration of 10 percent by weight based on weight of a polymer. Injection valve 31 is adjusted to maintain a pressure differential of approximately 450 p.s.i.g. (32 atmos.). Polymer pressure at injection point 32 is approximately 50 p.s.i.g. (3.4 atmos.). Under these conditions the filter pressure at the spinning machine is found to be only 200 p.s.i.g. (13.6 atmos.), i.e., only one-tenth that experienced in (a) when no ethylene oxide is injected. The yarn produced has a relative viscosity of 37, a carboxyl content of 0.4 eq./$10^6$ g., an ether content of 4.5 mol percent.

c. The above experiment is repeated with the injection of ethylene oxide being regulated to give a concentration of 0.8 percent by weight in the polymer. Ethylene oxide line pressure was about 150 p.s.i.g. Under these conditions, the filter pressure is found to be 1500 p.s.i.g. (102 atmos.), which is considerably lower than the 2000 p.s.i.g. (135 atmos.) experienced when no ethylene oxide is injected. The yarn produced has a relative viscosity of 37, a free carboxyl content of 1.0 eq./$10^6$ g., an ether content of 5.8 mol percent, and exhibits a tenacity of 5.8 g.p.d. with a break elongation of 19 percent.

d. The above experiment is repeated with the injection rate of ethylene oxide being regulated to give a concentration of 0.3 percent by weight in the polymer. Under these conditions, the filter pressure is found to be 1800 p.s.i.g. (123 atmos.). It is remarkable that even this small amount of ethylene oxide provides a significant reduction in filter pressure in comparison with that observed when no ethylene oxide is injected. The yarn produced has a relative viscosity of 44, a free carboxyl content of 2.6 eq./$10^6$ g., an ether content of 6.9 mol percent, and exhibits a tenacity of 5.7 g.p.d. with a break elongation of 18.3 percent.

Examination of the above fibers by microscope yields no evidence that bubbles or voids are formed as a result of the injection of ethylene oxide.

EXAMPLE II

The general procedure of example I is repeated with the exception that the fiber consists of a bed of sand, which provides higher pressures, and the piping connections are shortened so that the total time available for mixing the oxirane with the molten polymer is reduced to a very low level. The example illustrates that even short mixing times provide a desirable reduction in melt viscosity as evidenced by reduced filter pressures.

Polyethylene terephthalate flake having a relative viscosity of 65 and a TiO$_2$ content of 0.1 percent is charged to the hopper 20 of the apparatus illustrated in FIG. 2. The screw melter temperature is adjusted to 295° C. and rate of polymer throughput adjusted to give a total mixing time between oxirane injection point 32 and spinneret 28 of 3.5 minutes. The temperature of the spinning assembly is maintained at 305° C.

a. The process is operated under the conditions described above with no ethylene oxide injected into the molten polymer. The polymer pressure immediately above the filter is measured and found to be 3700 p.s.i.g. (252 atmos.). The extruded filaments have a relative viscosity of 41.

b. With the general conditions maintained as above, ethylene oxide is charged to supply vessel 29 and metering pump 30 operated to inject ethylene oxide into the polymer at a rate sufficient to provide a concentration of 0.95 percent by weight. The polymer pressure at injection point 32 is about 50 p.s.i.g. (3.4 atmos.) and injection valve 31 is adjusted to maintain a pressure differential of approximately 150 p.s.i.g. (10.2 atmos.) (higher pressure on the ethylene oxide supply line). With the ethylene oxide injected at this rate, the filter pressure is found to be 2900 p.s.i.g. (197 atmos.), i.e., 800 p.s.i.g. (55 atmos.) less than that observed when no ethylene oxide is injected. The extruded filaments have a relative viscosity of 41 and examination of the filaments yields no evidence of bubble or void formation.

c. The above procedure is repeated with the rate of injection of ethylene oxide being reduced to give a concentration of 0.40 percent by weight of ethylene oxide in the polymer. The filter pressure under these conditions is found to be 3300 p.s.i.g. (225 atmos.), i.e., 400 p.s.i.g. (27 atmos.) less than that observed when no ethylene oxide is injected. The extruded filaments have a relative viscosity of 45 and examination of the filaments yields no evidence of bubble or void formation.

EXAMPLE III

This example further illustrates that desirable results are obtained with very short mixing times.

The general procedure of example II is repeated with the rate of throughput raised to give the shorter mixing time of 2.4 minutes. With no ethylene oxide injected, the filter pressure is found to be 4500 p.s.i.g. (306 atmos.). With ethylene oxide injected at a rate sufficient to give 0.65 weight percent in the polymer, the filter pressure is found to be reduced to 4200 p.s.i.g. (286 atmos.). Reduction of the amount of ethylene oxide injected to a level of 0.45 percent by weight results in a filter pressure of 4350 p.s.i.g. (296 atmos.), which is still 150 p.s.i.g. (10 atmos.) less than that observed when no ethylene oxide is injected.

EXAMPLE IV

This example illustrates the process of the invention using 1,2-epoxypropane as the oxirane compound.

Polyethylene terephthalate having a relative viscosity of 65 and a TiO$_2$ content of 0.1 percent is melt-spun using apparatus similar to that shown in FIG. 2. The screw melter is operated at a temperature of 305° C., the filter-spinneret assembly at 300° C., and polymer flow is adjusted to give a throughput of 17 g./min. through one spinneret. Exposure time between injection point 32 and spinneret 28 is approximately 3.5 minutes. The filter consists of five layers of 200-mesh stainless steel screen. Filaments extruded from the spinneret are quenched and wound up at a speed of 200 ft./min.

a. The apparatus is first operated with valve 31 closed so that no oxirane compound is injected into the polymer. The measured filter pressure is 1700 p.s.i.g. (116 atmos.). The yarn produced is composed of polymer having an intrinsic viscosity of 0.689.

b. With the general conditions maintained as above, 1,2-expoxypropane is charged to supply vessel 29 and metering pump 30 operated to inject 1,2-epoxypropane into the polymer at a rate sufficient to provide a concentration of 1 percent by weight based on weight of polymer. Under these conditions the filter pressure at the spinning machines is found to be only 1550 p.s.i.g. (106 atmos.), i.e., 150 p.s.i.g. (106 atmos.) less than that experienced in (a) when no 1,2-epoxypropane is injected. The yarn produced is composed of polymer having an intrinsic viscosity of 0.681.

c. The above experiment is repeated with the injection of 1,2-epoxypropane being regulated to give a concentration of 0.3 percent by weight in the polymer. Under these conditions the filter pressure is found to be 1600 p.s.i.g. (109 atmos.), i.e., 100 p.s.i.g. (7.0 atmos.) less than conditions under (a). The yarn produced is composed of polymer having an intrinsic viscosity of 0.691.

Examination of the above fibers by microscope yields no evidence that bubbles or voids are formed as a result of the injection of 1,2-epoxypropane

EXAMPLE V

Figure 1:
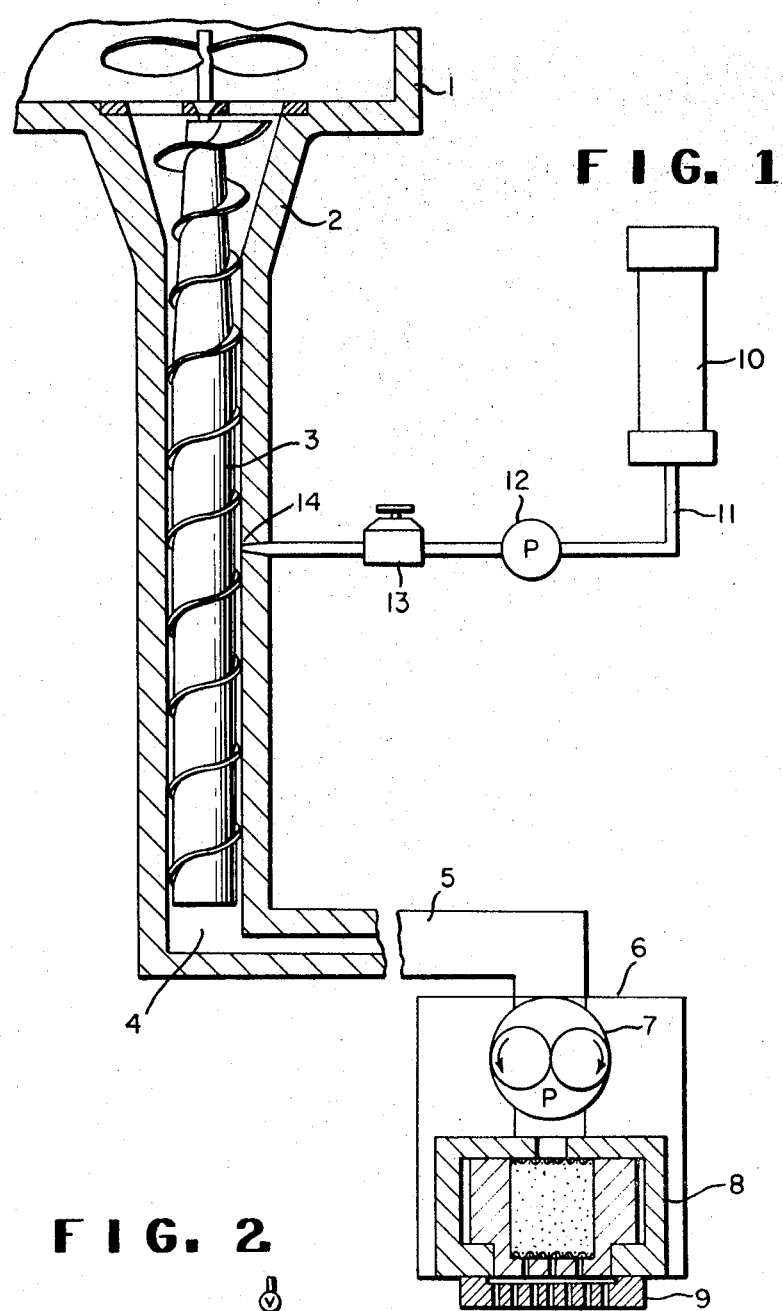
FIG. 1 is a schematic representation, partially in section, of one specific process and apparatus suitable for carrying out the invention. This embodiment utilizes injection of oxirane into a screw-pump at the exit end of a polymerization vessel.

This example illustrates the process of the invention using small concentrations of ethylene oxide in apparatus of the type shown in FIG. 1.

Apparatus of the general type shown in FIG. 1 is modified by inserting a pressure sensor in the screw-pump cavity near injection point 14, to measure polymer pressure at that point, and by attaching a capillary viscometer to conduit 5 a short distance down stream from screw-pump exit 4. The viscometer is similar to model PT-422 sold by Dynisco Corp., Westwood, Mass., and indicates polymer melt viscosity on a relative scale. Molten polyethylene terephthalate, having a relative viscosity of about 55, a $TiO_2$ content of about 0.1 percent and a free carboxyl content of about 10 eq./$10^6$ g. as fed from finisher vessel 1, is pressurized by screw 3 and transferred at a rate of about 75.6 lbs./hr. (34.2 kg./hr.) past injection point 14. The molten polymer then traverses transfer line 5 to spinning machine 6 where a gear pump urges the polymer at a uniform rate through a filter and spinneret maintained at a temperature of 308° C. The extruded filaments, which have a relative viscosity of 51, are quenched and subsequently drawn 6.0X in a stream jet supplied with 370° C. steam. The drawn filaments are wound up at a speed of 2750 yds./min. (2515 meters/min.).

Transfer line 5 is also fitted with a bypass "bleed" valve so that only a part of the polymer supply goes through the spinning machine with the remainder being extruded to waste. The polymer has an exposure time of 2 minutes between injection point 14 and viscometer, and 16 minutes between injection point 14 and spinneret.

a. The apparatus is first operated with valve 13 closed so that no oxirane compound is injected into the polymer. Measured values are noted and recorded for polymer pressure at injection point 32, melt viscosity via capillary viscometer, filter pressure, and yarn tensile properties. These values are recorded in the table below.

b. With the general conditions maintained as above, ethylene oxide from supply vessel 10 is forced by metering pump 12 through injection valve 13 to injection point 14. Metering pump 12 is adjusted to give 0.25 percent by weight ethylene oxide in the polymer. The effect of ethylene oxide injection is noted and recorded in table 1 below.

c. The above procedure is repeated with metering pump 12 adjusted to give an ethylene oxide concentration of 0.38 percent by weight in the polymer. The results are recorded in table 1 below.

Examination of the date in the table clearly indicates that even a small amount of ethylene oxide injected into the polymer under pressure results in reduced polymer melt viscosity as indicated both by capillary viscometer and by filter pressure measurement. Furthermore, the ethylene oxide injection does not have a deleterious effect on yarn tensile properties.

Examination of the above yarns under a microscope yields no evidence of bubble or void formation.

TABLE 1

| | (a) | (b) | (c) |
|---|---|---|---|
| Ethylene oxide injected at point 14, wt. percent | None | 0.25 | 0.38 |
| Polymer pressure at point 14, p.s.i.g. (atmos.) | 215(14.6) | 217(14.7) | 235(16) |
| Capillary viscometer reading | 28 | 20 | 18 |
| Filter pressure, p.s.i.g. (atmos.) | 3,850(262) | 3,650(248) | 3,450(235) |
| Spinning assembly throughput, lb./hr. (kg./hr.) | 38.2(17.3) | 38.4(17.4) | 38.4(17.4) |
| Yarn tenacity, g.p.d | 8.9 | 9.0 | 8.9 |
| Yarn elongation at break, percent | 15.0 | 14.2 | 14.6 |

Although the invention has been described particularly with respect to the preparation of polyethylene terephthalate fibers, it will be recognized by those skilled in the art that the principles of the invention may be applied to the transporting of molten polyesters under many conditions involving restriction of flow. For example, the invention is also useful in the manufacture of extruded polyester film.

I claim:

1. In the process of melt-spinning tenacious fibers of high-molecular-weight ethylene terephthalate polymer wherein molten linear condensation polymer is forced under pressure to a spinning operation, passes through a metering pump, filter and spinneret, and is extruded into a lower pressure zone, the improvement which comprises dispersing in the pressurized molten polymer from 1 to 45 minutes prior to the spinning operation a low-boiling oxirane compound to reduce the melt viscosity of the high-molecular-weight polymer, and maintaining the oxirane-containing molten polymer under pressure until the polymer is extruded, said oxirane compound being selected from the group consisting of ethylene oxide and 1,2-epoxypropane.

2. The process defined in claim 1 wherein the oxirane compound is added to the polymer 5 to 20 minutes before the polymer reaches the metering pump at the spinning operation.

3. The process defined in claim 1 wherein the amount of oxirane compound added to the polymer is from 0.3 percent to 10 percent by weight based on the weight of polymer.

4. The process defined in claim 1 wherein the ethylene terephthalate polymer has a relative viscosity of at least 50 when determined as a 10 percent solution in a mixture of 10 parts phenol and 7 parts 2,4,6-trichlorophenol by weight at 25° C.

5. The process defined in claim 2 wherein said oxirane compound is ethylene oxide.

* * * * *